United States Patent
Zhang (10) Patent No.: US 12,167,450 B2
(45) Date of Patent: Dec. 10, 2024

(54) APPARATUS AND METHOD OF WIRELESS COMMUNICATION

(71) Applicant: GUANGDONG OPPO MOBILE TELECOMMUNICATIONS CORP., LTD., Guangdong (CN)

(72) Inventor: Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 269 days.

(21) Appl. No.: 17/694,383

(22) Filed: Mar. 14, 2022

(65) Prior Publication Data

US 2022/0201753 A1 Jun. 23, 2022

Related U.S. Application Data

(63) Continuation of application No. PCT/CN2020/130648, filed on Nov. 20, 2020.

(60) Provisional application No. 62/938,923, filed on Nov. 21, 2019.

(51) Int. Cl.
H04W 74/0808 (2024.01)
H04W 74/00 (2009.01)
H04W 74/08 (2024.01)

(52) U.S. Cl.
CPC ..... *H04W 74/0808* (2013.01); *H04W 74/006* (2013.01); *H04W 74/0875* (2013.01)

(58) Field of Classification Search
CPC ........... H04W 74/0808; H04W 74/006; H04W 74/0875
See application file for complete search history.

(56) References Cited

U.S. PATENT DOCUMENTS

| 2019/0349966 | A1 | 11/2019 | Salem et al. |
| 2022/0279579 | A1* | 9/2022 | He .................. H04L 27/2607 |
| 2022/0304058 | A1* | 9/2022 | Wang ................ H04W 72/0446 |

FOREIGN PATENT DOCUMENTS

| CN | 108886818 A | 11/2018 |
| EP | 3435580 A1 | 1/2019 |

OTHER PUBLICATIONS

EP Office Action mailed Mar. 21, 2023 in App. 20890616.4, 8 pages.
International Search Report Mailed Feb. 18, 2021 In Application No. PCT/CN2020/130648.
Nokia, Nokia Shanghai Bell, Channel access and co-existence for NR-U operation, 3GPP TSG RAN WG1 Meeting #99 R1-1912257, Reno, US, Nov. 18-22, 2019, 17 pages.

(Continued)

*Primary Examiner* — Ashley Shivers
(74) *Attorney, Agent, or Firm* — PERKINS COIE LLP (57) ABSTRACT

An apparatus and a method of wireless communication are provided. The method by a user equipment (UE) includes determining, based on a signaling from a base station, a combination of a listen before talk (LBT) type, a cyclic prefix (CP) extension, and a channel access priority class (CAPC) for an uplink transmission to the base station. This can solve issues in the prior art, provide an indication of LBT related information for a UE, provide a method for indicating an LBT type, a length of a CP extension, and a CAPC in an uplink grant, provide a good communication performance, and/or provide high reliability.

12 Claims, 2 Drawing Sheets

500

502 — Configuring a signaling by the base station to a user equipment (UE), wherein the signaling indicates one or more of a listen before talk (LBT) type, a length of a cyclic prefix (CP) extension, and a channel access priority class (CAPC)

504 — Allowing the UE to access to the base station in accordance with one or more of the LBT type, the length of the CP extension, and the CAPC (56) References Cited

OTHER PUBLICATIONS

Sharp, Channel access procedure for NR-U, GPP TSG RAN WG1 Meeting #99 R1-1912764, Reno, USA, Nov. 18-22, 2019, 7 pages.
First Office Action of the Chinese application No. 202210861268.9, issued on Jul. 29, 2023. 11 pages with English translation.
Second Office Action of the European application No. 20890616.4, issued on Sep. 12, 2023. 7 pages.
Ericsson "Channel access procedures" R1-1912709; 3GPP TSG-RAN WG1 Meeting #99; Reno, USA; Nov. 18-22, 2019. 10 pages.
Extended European Search Report for European Application No. 20890616.4 issued Sep. 9, 2022. 9 pages.
Nokia et al. "Feature Lead's Summary on Channel Access Procedures" R1-1912258; 3GPP TSG RAN WG1 Meeting #99; Reno, US; Nov. 18-22, 2019. 26 pages.
Examination Report for European Application No. 20890616.4 Issued Feb. 14, 2024, 10 Pages.
Examination Report for European Application No. 20890616.4 Issued Jul. 18, 2024, 9 Pages.

\* cited by examiner

APPARATUS AND METHOD OF WIRELESS COMMUNICATION

CROSS-REFERENCE TO RELATED APPLICATIONS

The present application is a continuation application of International PCT Application No. PCT/CN2020/130648, filed on Nov. 20, 2020, which claims priority of U.S. provisional patent application No. 62/938,923, filed on Nov. 21, 2019. The above-identified applications are hereby incorporated by reference in their entirety.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

An unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability. An LBT is also called a channel access procedure. UE performs the channel access procedure before the transmission, if the channel access procedure is successful, i.e. the channel is sensed to be idle, the UE starts to perform the transmission. If the channel access procedure is not successful, i.e. the channel is sensed to be not idle, the UE cannot perform the transmission. There is an open issue about an indication of LBT related information for the UE.

Therefore, there is a need for an apparatus (such as a user equipment (UE) and/or a base station) and a method of wireless communication, which can solve issues in the prior art, provide an indication of LBT related information for a UE, provide a method for indicating one or more of an LBT type, a length of a CP extension, and a CAPC in an uplink grant, provide a good communication performance, and/or provide high reliability.

SUMMARY

An object of the present disclosure is to propose an apparatus (such as a user equipment (UE) and/or a base station) and a method of wireless communication, which can solve issues in the prior art, provide an indication of LBT related information for a UE, provide a method for indicating one or more of an LBT type, a length of a CP extension, and a CAPC in an uplink grant, provide a good communication performance, and/or provide high reliability.

In a first aspect of the present disclosure, a method of wireless communication by a user equipment (UE), comprising determining, based on a signaling from a base station, a combination of a listen before talk (LBT) type, a cyclic prefix (CP) extension, and a channel access priority class (CAPC) for an uplink transmission to the base station.

In a second aspect of the present disclosure, a method of wireless communication by a base station comprising configuring, to a user equipment (UE), a signaling to indicate a combination of a listen before talk (LBT) type, a cyclic prefix (CP) extension, and a channel access priority class (CAPC) for an uplink transmission from the UE to the base station.

In a third aspect of the present disclosure, a user equipment comprises a memory, a transceiver, and a processor coupled to the memory and the transceiver. The processor is configured to determine, based on a signaling from a base station, a combination of a listen before talk (LBT) type, a cyclic prefix (CP) extension, and a channel access priority class (CAPC) for an uplink transmission to the base station.

In a fourth aspect of the present disclosure, a base station comprises a memory, a transceiver, and a processor coupled to the memory and the transceiver. The processor is configured to configure, to a user equipment (UE), a signaling to indicate a combination of a listen before talk (LBT) type, a cyclic prefix (CP) extension, and a channel access priority class (CAPC) for an uplink transmission from the UE to the base station.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In an unlicensed band, a recent new radio unlicensed spectrum (NRU) agreement concludes that a downlink channel occupancy time (COT) initiated by a base station can be shared with a user equipment (UE) for uplink transmission. The UE can perform a quick listen before talk (LBT), i.e. LBT category 1 (immediate transmission without LBT) if the base station creates a gap up to 16 μs. The UE can also perform an LBT category 2 (one shot LBT) if the base station creates a gap having a duration of 16 μs or 25 μs. When the 16-μs LBT category 2 is used, the way of doing an LBT category 2 with 16-μs gap is not defined. Some embodiments of the present disclosure provide methods of implementing an LBT category 2 with 16-μs gap.

Furthermore, an LBT is also called a channel access procedure. At least for the case where a downlink (DL) burst follows a uplink (UL) burst within a gNB-initiated channel occupancy time (COT) and there is no gap larger than 25 μs between any two transmissions in the COT, the channel access schemes in Table 1 apply for the DL burst following a UL burst. Note: a DL burst is defined as a set of transmissions from a given gNB having no gaps or gaps of no more than 16 μs. Transmissions from a gNB having a gap of more than 16 μs are considered as separate DL bursts.

TABLE 1

| Channel access schemes for a DL burst follows a UL burst within a gNB-initiated COT as LBE device | |
| --- | --- |
| Category (Cat) 1 Immediate transmission | Cat 2 LBT |
| When the gap from the end of the scheduled UL transmission to the | When the gap from the end of the scheduled UL transmission to the beginning of |

TABLE 1-continued

| Channel access schemes for a DL burst follows a UL burst within a gNB-initiated COT as LBE device | |
| --- | --- |
| Category (Cat) 1 Immediate transmission | Cat 2 LBT |
| beginning of the DL burst is up to 16 μsec | the DL burst is larger than 16 μsec but not more than 25 μsec |

Furthermore, channel access schemes for NR-based access for unlicensed spectrum can be classified into the following categories:

Category 1 (Cat1): Immediate Transmission after a Short Switching Gap

This is used for a transmitter to immediately transmit after a switching gap inside a COT. The switching gap from reception to transmission is to accommodate the transceiver turnaround time and is no longer than 16 μs. Cat1 16 μs may refer to that a gNB may transmit a DL transmission immediately after a short switching gap within a duration of 16 μs.

Category 2: LBT without Random Back-Off

The duration of time that the channel is sensed to be idle before the transmitting entity transmits is deterministic. In some embodiments, Cat2 16 μs may refer to that a gNB may transmit a DL transmission immediately after sensing the channel to be idle within a duration of 16 μs. In some embodiments, Cat2 25 μs may refer to that a gNB may transmit a DL transmission immediately after sensing the channel to be idle within a duration of 25 μs.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

There is an open issue about an indication of LBT related information for a UE. When operating within a shared base station-acquired COT (such as gNB-acquired COT), the UE does not know what LBT type, CAPC, and gap duration the UE should assume unless it is told by a base station (such as a gNB).

Some embodiments of the present disclosure provide an apparatus (such as a user equipment (UE) and/or a base station) and a method of wireless communication, which can solve issues in the prior art, provide an indication of LBT related information for a UE, provide a method for indicating one or more of an LBT type, a length of a CP extension, and a CAPC in an uplink grant, provide a good communication performance, and/or provide high reliability.

Figure 1:
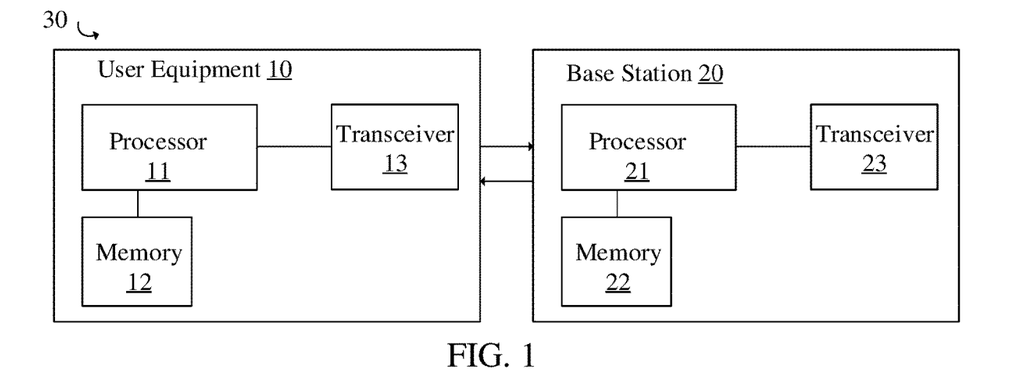
FIG. 1 is a block diagram of one or more user equipments (UEs) and a base station of wireless communication in a communication network system according to an embodiment of the present disclosure.

FIG. 1 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine, based on a signaling from the base station 20, a combination of a listen before talk (LBT) type, a cyclic prefix (CP) extension, and a channel access priority class (CAPC) for an uplink transmission to the base station 20. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

In some embodiments, the processor 21 is configured to configure, to the user equipment (UE) 10, a signaling to indicate a combination of a listen before talk (LBT) type, a cyclic prefix (CP) extension, and a channel access priority class (CAPC) for an uplink transmission from the UE 10 to the base station 20. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

Figure 2:
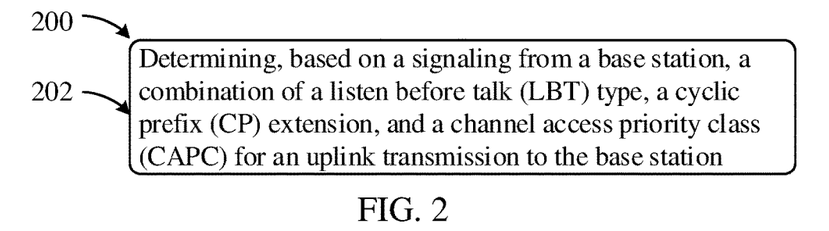
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, determining, based on a signaling from a base station, a combination of a listen before talk (LBT) type, a cyclic prefix (CP) extension, and a channel access priority class (CAPC) for an uplink transmission to the base station. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

Figure 3:
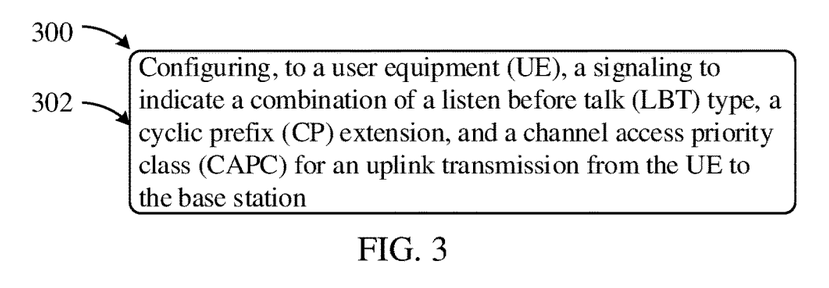
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring, to a user equipment (UE), a signaling to indicate a combination of a listen before talk (LBT) type, a cyclic prefix (CP) extension, and a channel access priority class (CAPC) for an uplink transmission from the UE to the base station. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

In some embodiments, the signaling comprises one or more of a downlink control information (DCI) and a UE-specific radio resource control (RRC) signaling. In some embodiments, the DCI comprises an information field indicating the combination of the LBT type, the CP extension, and the CAPC. In some embodiments, the information field in the DCI comprises bits indicating the combination of the LBT type, the CP extension, and the CAPC from a list of combinations of the LBT type, the CP extension, and the CAPC in the UE-specific RRC signaling. In some embodiments, the UE-specific RRC signaling indicates the list of combinations of the LBT type, the CP extension, and the CAPC from a first table. In some embodiments, the first table is predefined. For example, the first table is predefined in a 3rd generation partnership project (3GPP) technical specification. In some embodiments, the list of combinations of the LBT type, the CP extension, and the CAPC is a partial of the first table.

In some embodiments, the first table comprises entire combinations of the LBT type, the length of the CP extension, and the CAPC. In some embodiments, the LBT type comprises a category 1 (Cat1) 16 μs LBT, a Cat2 16 μs LBT, a Cat2 25 μs LBT, or a Cat4 LBT. In some embodiments, a length of the CP extension is 0, C1 times a symbol length minus 25 μs, C2 times the symbol length minus 16 us minus a timing advance (TA), or C3 multiplied by the symbol length minus 25 us minus the TA. In some embodiments, the CAPC is 1, 2, 3, or 4.

In some embodiments, Cat1 16 μs comprises that the base station transmits a downlink transmission immediately after a short switching gap within a duration of 16 μs, Cat2 16 μs comprises that the base station transmits a downlink transmission immediately after sensing a channel to be idle within a duration of 16 μs, Cat2 25 μs comprises that the base station transmits a downlink transmission immediately after sensing a channel to be idle within a duration of 25 μs, or Cat 4 comprises that LBT with random back-off with a contention window of variable size. In some embodiments, wherein C1 is an integer, C2 is an integer, or C3 is an integer; and/or C2 is configured by the base station, or C3 is configured by the base station. In some embodiments, a number of the bits of the information field in the DCI is related to a number of rows in the list of combinations of the LBT type, the CP extension, and the CAPC or related to a number of combinations of the LBT type, the CP extension, and the CAPC in the list of combinations of the LBT type, the CP extension, and the CAPC.

In an example, C2 is integer and can be configured by the base station. C3 is integer and can be configured by the base station.

Table 2 illustrates that, in some embodiments, $\Delta_i$ is given by Table 2 with $C_1=1$ for $\mu \in \{0,1\}$, $C_1=2$ for $\mu=2$, and $C_2$ and $C_3$ given by higher-layer parameters. For contention-based random access, or in absence of higher-layer configuration of $C_2$ and $C_3$, the value of $C_1$ shall be set to the largest integer fulfilling $T_{ext}' < T_{symb,(l-1)mod7 \cdot 2^\mu}$ for each of the values of $i \in \{2,3\}$.

TABLE 2 variables $C_i$ and $\Delta_i$ for cyclic prefix extension

| $T_{ext}$ index i | $C_i$ | $\Delta_i$ |
| --- | --- | --- |
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

FIG. 1 illustrates that, in some embodiments, the processor 11 is configured to derive a signaling from the base station 20, and the signaling indicates one or more of a listen before talk (LBT) type, a length of a cyclic prefix (CP) extension, and a channel access priority class (CAPC). The processor 11 is configured to determine one or more of the LBT type, the length of the CP extension, and the CAPC to access to the base station 20. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

FIG. 1 illustrates that, in some embodiments, the processor 21 is configured to configure a signaling to the user equipment (UE) 10, wherein the signaling indicates one or more of a listen before talk (LBT) type, a length of a cyclic prefix (CP) extension, and a channel access priority class (CAPC). The processor 21 is configured to allow the UE 10 to access to the base station 20 in accordance with one or more of the LBT type, the length of the CP extension, and the CAPC. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

Figure 4:
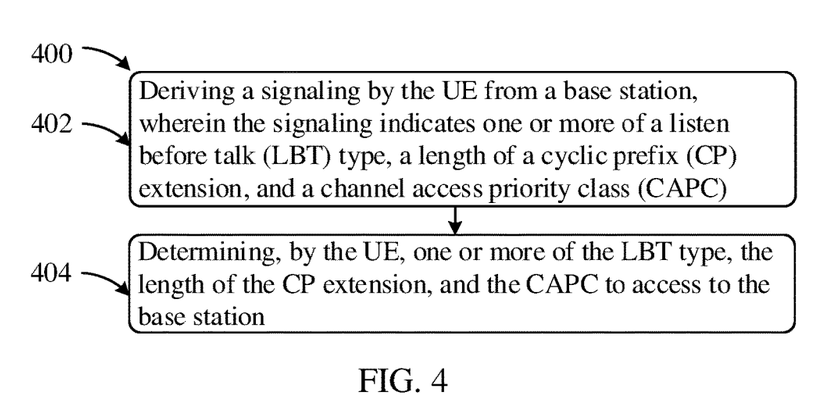
FIG. 4 is a flowchart illustrating a method of wireless communication performed by a user equipment (UE) according to an embodiment of the present disclosure.

FIG. 4 illustrates a method 400 of wireless communication by a user equipment (UE) according to an embodiment of the present disclosure. In some embodiments, the method 400 includes: a block 402, deriving a signaling by the UE from a base station, wherein the signaling indicates one or more of a listen before talk (LBT) type, a length of a cyclic prefix (CP) extension, and a channel access priority class (CAPC), and a block 404, determining, by the UE, one or more of the LBT type, the length of the CP extension, and the CAPC to access to the base station. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

Figure 5:
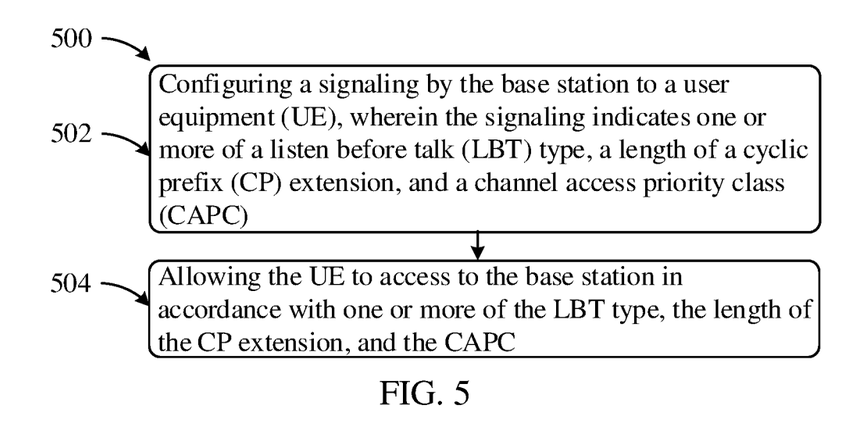
FIG. 5 is a flowchart illustrating a method of wireless communication performed by a base station according to an embodiment of the present disclosure.

FIG. 5 illustrates a method 500 of wireless communication by a base station according to an embodiment of the present disclosure. In some embodiments, the method 500 includes: a block 502, configuring a signaling by the base station to a user equipment (UE), wherein the signaling indicates one or more of a listen before talk (LBT) type, a length of a cyclic prefix (CP) extension, and a channel access priority class (CAPC), and a block 504, allowing the UE to access to the base station in accordance with one or more of the LBT type, the length of the CP extension, and the CAPC. This can solve issues in the prior art, provide an indication of LBT related information for a UE, provide a method for indicating one or more of an LBT type, a length of a CP extension, and a CAPC in an uplink grant, provide a good communication performance, and/or provide high reliability.

In some embodiments, the signaling comprises one or more of a downlink control information (DCI) and a UE-specific radio resource control (RRC) signaling. In some embodiments, the DCI comprises X bits to indicate entire combinations of the LBT type, the length of the CP extension, and the CAPC, where X is an integer and greater than 1. In some embodiments, the DCI comprises A bits to indicate the LBT type, the DCI comprises B bits to indicate the length of the CP extension, and the DCI comprises C bits to indicate the CAPC, where A, B, and C are integers and greater than or equal to 1. In some embodiments, $2^X$ is greater than A times B times C, and A times B times C is greater than $2^{X-1}$. In some embodiments, the DCI comprises Y bits to indicate entire combinations of the LBT type and the length of the CP extension, and the DCI comprises Z bits to indicate the CAPC, where Y and Z are integers and greater than or equal to 1.

In some embodiments, the DCI comprises first bits, and the first bits are used to indicate a partial of entire combinations of the LBT type, the length of the CP extension, and the CAPC. In some embodiments, the first bits comprise one or more of a number of the first bits and a value of the first bits. In some embodiments, the UE-specific RRC signaling comprises a second table, the second table comprises a partial of a first table comprising entire combinations of the LBT type, the length of the CP extension, and the CAPC. In some embodiments, the first bits are used to indicate combinations in the second table. In some embodiments, the UE is configured to access the base station in accordance with the first bits by the DCI and the second table by the UE-specific RRC signaling. In some embodiments, if the first bits are greater than a pre-defined threshold, the UE uses entire bits of the DCI to determine one or more of the LBT type, the length of the CP extension, and the CAPC to access to the base station. In some embodiments, the entire bits are 7 bits. In some embodiments, the entire bits comprise X bits. In some embodiments, the entire bits comprise A bits, B bits, and C bits. In some embodiments, the entire bits comprise Y bits and Z bits.

In some embodiments, if the first bits are less than a pre-defined threshold, the UE accesses the base station in accordance with the first bits by the DCI and the second table by the UE-specific RRC signaling. In some embodiments, the LBT type comprises a category 1 (Cat1) 16 μs LBT, a Cat2 16 μs LBT, a Cat2 25 μs LBT, or a Cat4 LBT. In some embodiments, the length of the CP extension is 0, C1 times a symbol length minus 25 μs, C2 times the symbol length minus 16 μs minus a timing advance (TA), or C3 multiplied by the symbol length minus 25 μs minus the TA. In some embodiments, the CAPC is 1, 2, 3, 4, or decided by the UE. In some embodiments, one or more forbidden combinations or one or more error combinations of one or more of the LBT type, the length of the CP extension, and the CAPC is removed by the base station or determined by the UE.

In an example, C1 is integer and can be configured by the base station. C2 is integer and can be configured by the base station. C3 is integer and can be configured by the base station.

Table 2 illustrates that, in some embodiments, $\Delta_i$ is given by Table 2 with $C_1=1$ for $\mu \in \{0,1\}$, $C_i=2$ for $\mu=2$, and $C_2$ and $C_3$ given by higher-layer parameters. For contention-based random access, or in absence of higher-layer configuration of $C_2$ and $C_3$, the value of $C_i$ shall be set to the largest integer fulfilling $T_{ext}{}^i < T_{symb,(l-1)mod7} \cdot 2^{\mu}$ for each of the values of $i \in \{2,3\}$.

TABLE 2 variables $C_i$ and $\Delta_i$ for cyclic prefix extension

| $T_{ext}$ index i | $C_i$ | $\Delta_i$ |
|---|---|---|
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

In some embodiments, one or more forbidden combinations or one or more error combinations of one or more of the LBT type, the length of the CP extension, and the CAPC is determined by the UE in accordance with one or more pre-determined error combinations from a protocol. In some embodiments, one or more forbidden combinations or one or more error combinations of one or more of the LBT type, the length of the CP extension, and the CAPC comprises a combination of C2 times the symbol length minus 16 us minus the TA and the Cat2 25 μs LBT, a combination of C3 multiplied by the symbol length minus 25 us minus the TA and the Cat1 16 μs LBT, and/or a combination of C3 multiplied by the symbol length minus 25 us minus the TA and the Cat2 16 μs LBT. In some embodiments, when the UE operates in a load based equipment (LBE) mode, the CAPC is configured in the X bits of the DCI or in the first table by the base station. In some embodiments, when the UE operates in a frame based equipment (FBE) mode, the CAPC is not configured in the X bits of the DCI or the first table by the base station, and a third table comprising entire combinations of the LBT type and the length of the CP extension is formed by the base station.

Some embodiments of the present disclosure provide an apparatus (such as a user equipment (UE) and/or a base station) and a method of wireless communication, which can solve issues in the prior art, provide an indication of LBT related information for a UE, provide a method for indicating one or more of an LBT type, a length of a CP extension, and a CAPC in an uplink grant, provide a good communication performance, and/or provide high reliability. Some embodiments of the present disclosure provide methods for indicating one or more of an LBT type, a length of a CP extension, and a CAPC in an uplink grant. The following are some examples of implementing these methods.

Example

FIG. 1 illustrates that, in some embodiments, a gNB 20 configures X bits in a DCI to indicate entire combinations of the followings: an LBT type, a length of a CP extension, and a CAPC. Alternatively, the gNB 20 can also determine A bits in the DCI to indicate the LBT type, B bits in the DCI to indicate the length of the CP extension, and C bits in the DCI to indicate the CAPC. Further, the gNB 20 sends the DCI to a UE 10. Alternatively, $2^x > A*B*C > 2^{x-1}$. Alternatively, the gNB 20 configures Y bits in the DCI to indicate the entire combinations of the LBT type and the length of the CP extension, and the gNB 20 configures Z bit individually to indicate the CAPC. The UE 10 derives the DCI from the gNB 20 and determines the LBT type, the length of the CP extension, and the CAPC to access to the gNB 20.

Example

FIG. 1 illustrates that, in some embodiments, a gNB 20 determines a first table which includes entire combinations of at least one of followings: an LBT type, a length of a CP extension, and a CAPC. The gNB 20 selects partial of the entire combinations to form a second table, configures the second table into a UE-specific RRC signaling, and sends the second table via the UE-specific RRC signaling to a UE 10. The gNB 20 determines bits (for example, a number of the bits and a value of each bit, etc.) for indicating the combinations in the second table in the DCI and sends the determined DCI to the UE 10. The UE 10 derives the UE-specific RRC signaling and the DCI to access to the gNB 20. In details, the UE 10 is configured to access the gNB 20 according to the bits and the second table. For example, the value of the bits is "001", and the number of the combinations of the second table is 8. Therefore, the UE 10 can determine the combination (e.g. LBT Type=cat4, CP extension=0, CAPC=1) corresponding to "001". The second table may refer to a list of combinations of cyclic prefix (CP) extension, channel access priority class (CAPC), and LBT type (UL channel access type).

Example

FIG. 1 illustrates that, in some embodiments, a gNB 20 determines a first table which includes entire combinations of at least two of followings: an LBT type, a length of a CP extension, and a CAPC. The gNB 20 selects partial of the entire combinations and if available bits corresponding to the selected combinations are greater than a pre-defined threshold in a DCI, the gNB 20 configures 7 bits in the DCI in a manner as descripted in the alternative solutions of the above example. If not, the gNB 20 can form a second table, configure the second table into a UE-specific RRC signaling, and send the second table via the UE-specific RRC signaling to a UE 10. For example, if the pre-defined threshold is 3 bits, and the available bits corresponding to the selected combinations is 2 bits, the gNB 20 can configured 2 bits into the DCI for corresponding the selected combinations. If the pre-defined threshold is 3 bits and the available bits corresponding to the selected combinations is 4 bits, the gNB 20 will make use of entire 7 bits of the DCI to indicate the LBT type, the length of the CP extension, and the CAPC.

Example

RRC configuration supports indication of all the combinations except: combination of "C2*symbol length−16 us−TA" and "Cat2 25 μs", combination of "C3*symbol length−25 us−TA" and "Cat1 16 μs", and/or combination of "C3*symbol length−25 us−TA" and "Cat2 16 μs". FIG. 1 illustrates that, in some embodiments, combined with the above examples, a gNB 20 can remove these forbidden combinations. When the gNB 20 selects partial of entire combinations to form a second table and configures the second table into a UE-specific RRC signaling; or after deriving the UE-specific RRC signaling and a DCI from the gNB 20, the UE 10 can determine an error combination in accordance with a pre-determined error combination from the protocol.

Example

An LBT type is illustrated in following table 3, a CP extension is illustrated in following table 4, and a CAPC is illustrated in following table 5 or 6.

TABLE 3

| LBT Type |
| --- |
| LBT Type |
| Cat1 16 μs |
| Cat2 16 μs |
| Cat2 25 μs |
| Cat4 |

TABLE 4

| CP extension |
| --- |
| CP extension |
| 0 (i.e. no CP extension) |
| C1*symbol length − 25 us |
| C2*symbol length − 16 us − TA |
| C3*symbol length − 25 us − TA |

TABLE 5

| CAPC |
| --- |
| CAPC |
| 1 |
| 2 |
| 3 |
| 4 |
| decided by UE |

TABLE 6

| CAPC |
| --- |
| CAPC |
| 1 |
| 2 |
| 3 |
| 4 |

In some embodiments, the LBT type, the length of the CP extension, and the CAPC are jointly encoded in the uplink grant. The combinations of the LBT type, the length of the CP extension, and the CAPC that can be dynamically signaled are RRC configured for the UE with UE-specific RRC signaling. RRC configuration supports indication of all the combinations of the rows in the above tables 3 to 6 below except: combination of "C2*symbol length−16 us−TA" and "Cat2 25 μs", combination of "C3*symbol length−25 us−TA", "Cat1 16 μs", combination of "C3*symbol length−25 us−TA" and "Cat2 16 μs", and/or combination of "C1*symbol length−25 us" and "Cat1 16 μs" or "Cat2 16 μs". A bitfield in a DCI has bits depending on how many combinations the RRC signaling indicates for the UE.

In some embodiments, it is noted that in mode LBE, the CAPC can be configured in the X bits in the DCI or into the first table. On the other hand, in mode FBE, it is not necessary to configure the CAPC in the X bits in the DCI or into the first table and form a third table, which includes entire combinations of the LBT type and the length of the CP extension.

For LBE:

In some embodiments, for signaling of the LBT type and the CP extension for both downlink assignment and uplink Grant, the following table 7 is used:

TABLE 7

| LBT Type | CP extension |
| --- | --- |
| Cat1 16 μs | C2*symbol length − 16 us − TA |
| Cat2 25 μs | C3*symbol length − 25 us − TA |
| Cat2 25 μs | C1*symbol length − 25 us |
| Cat4 | 0 |

CAPC is not indicated explicitly: for the uplink grant case the UE assumes CAPC=4 in within gNB COT, and for UE initiated COTs (Cat4 case) the UE may select the CAPC by itself. For the downlink assignment case, physical uplink control channel (PUCCH) may use the highest CAPC in any case, as agreed earlier. Because fallback DCIs are used relatively seldom, a simple design should suffice. Cat1 16 us and Cat2 25 us are supported with a CP extension that is suitable for the first uplink slot. Cat 2 is also supported within the uplink burst with "C1*symbol length−25 us". With Cat 4 the transmission can start at the symbol boundary.

In some embodiments, a group as illustrated in table 8 is used to consider the following 3 bit proposal for DCI uplink grant that allows for the LBT type, the CP Extension, and the CAPC to be signaled:

TABLE 8

| Index | LBT type | CP Extension | CAPC |
| --- | --- | --- | --- |
| 0 | 16 us CAT-1 | C2*symbol length − 16 us − TA | Not available |
| 1 | 16 us CAT-2 | C2*symbol length − 16 us − TA | Not available |
| 2 | 25 us CAT-2 | C1*symbol length − 25 us | Not available |
| 3 | 25 us CAT-2 | C3*symbol length − 25 us − TA | Not available |
| 4 | CAT-4 | 0 us | 1 |
| 5 | CAT-4 | 0 us | 2 |
| 6 | CAT-4 | 0 us | 3 |
| 7 | CAT-4 | 0 us | 4 |

For FBE:

The following table 9 is used for both downlink assignment and uplink Grant.

TABLE 9

| LBT Type | CP extension |
| --- | --- |
| Cat1 16 μs | C2*symbol length − 16 us − TA |
| Cat2 25 μs | C3*symbol length − 25 us − TA |
| Cat2 25 μs | C1*symbol length − 25 us |
| Cat2 25 μs | 0 |

In summary, according to the disclosed methods of the above embodiments, the UE can determine one or more of the LBT type, the length of the CP extension, and the CAPC the UE should assume unless it is told by the gNB. Also, the bits can be controlled for power saving.

Commercial interests for some embodiments are as follows. 1. Solving issues in the prior art. 2. Providing an indication of LBT related information for a UE. 3. Providing a method for indicating one or more of an LBT type, a length of a CP extension, and a CAPC in an uplink grant. 4.

Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 6:
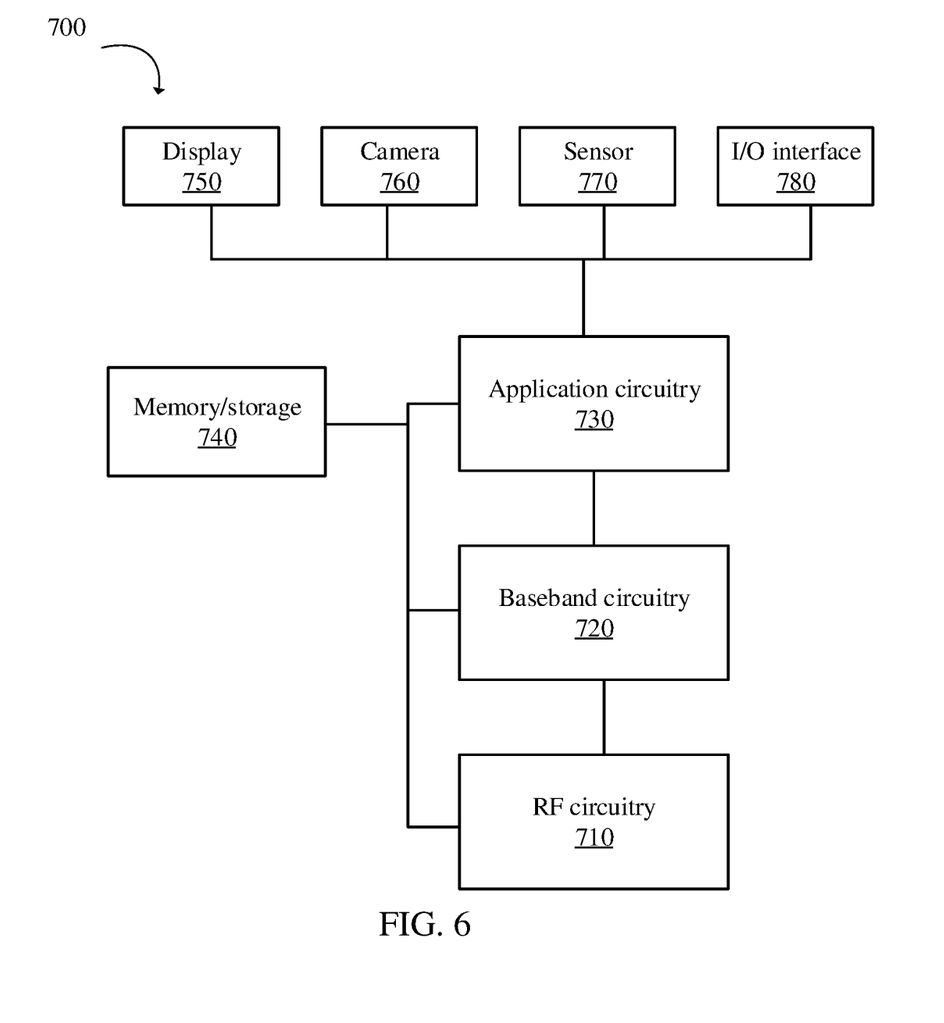
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units. If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A wireless communication method by a user equipment (UE), comprising:
    determining, by the UE based on a signaling from a base station, a combination of a listen before talk (LBT) type, a cyclic prefix (CP) extension, and a channel access priority class (CAPC) for an uplink transmission to the base station; wherein the signaling comprises a downlink control information (DCI) and a UE-specific radio resource control (RRC) signaling; wherein the DCI comprises an information field indicating the combination of the LBT type, the CP extension, and the CAPC; wherein the information field in the DCI comprises indexes indicating the combination of the LBT type, the CP extension, and the CAPC from a list of combinations of the LBT type, the CP extension, and the CAPC in the UE-specific RRC signaling; wherein the UE-specific RRC signaling indicates the list of combinations of the LBT type, the CP extension, and the CAPC from a first table; wherein the first table is predefined; wherein the list of combinations of the LBT type, the CP extension, and the CAPC is a partial of the first table; wherein a number of the indexes of the information field in the DCI is related to a number of combinations of the LBT type, the CP extension, and the CAPC in the list of combinations of the LBT type, the CP extension, and the CAPC.

2. The method of claim 1, wherein the first table comprises entire combinations of the LBT type, the length of the CP extension, and the CAPC.

3. The method of claim 1, wherein the LBT type comprises a category 1 (Cat1) 16 μs LBT, a Cat2 16 μs LBT, a Cat2 25 μs LBT, or a Cat4 LBT.

4. The method of claim 1, wherein a length of the CP extension is 0, C1 times a symbol length minus 25 μs, C2 times the symbol length minus 16 μs minus a timing advance (TA), or C3 multiplied by the symbol length minus 25 μs minus the TA; wherein C1 is an integer, C2 is an integer, or C3 is an integer; and/or C2 is configured by the base station, or C3 is configured by the base station.

5. The method of claim 1, wherein the CAPC is 1, 2, 3, or 4.

6. The method of claim 3, wherein Cat1 16 μs comprises that the base station transmits a downlink transmission immediately after a short switching gap within a duration of 16 μs, Cat2 16 μs comprises that the base station transmits a downlink transmission immediately after sensing a channel to be idle within a duration of 16 μs, Cat2 25 μs comprises that the base station transmits a downlink transmission immediately after sensing a channel to be idle within a duration of 25 μs, or Cat 4 comprises that LBT with random back-off with a contention window of variable size.

7. A wireless communication method by a base station, comprising:
    configuring, to a user equipment (UE), a signaling to indicate a combination of a listen before talk (LBT) type, a cyclic prefix (CP) extension, and a channel access priority class (CAPC) for an uplink transmission from the UE to the base station; wherein the signaling comprises a downlink control information (DCI) and a UE-specific radio resource control (RRC) signaling; wherein the DCI comprises an information field indicating the combination of the LBT type, the CP extension, and the CAPC; wherein the information field in the DCI comprises indexes indicating the combination of the LBT type, the CP extension, and the CAPC from a list of combinations of the LBT type, the CP extension, and the CAPC in the UE-specific RRC signaling; wherein the UE-specific RRC signaling indicates the list of combinations of the LBT type, the CP extension, and the CAPC from a first table; wherein the first table is predefined; wherein the list of combinations of the LBT type, the CP extension, and the CAPC is a partial of the first table; wherein a number of the indexes of the information field in the DCI is related to a number of combinations of the LBT type, the CP extension, and the CAPC in the list of combinations of the LBT type, the CP extension, and the CAPC.

8. The method of claim 7, wherein the LBT type comprises a category 1 (Cat1) 16 μs LBT, a Cat2 16 μs LBT, a Cat2 25 μs LBT, or a Cat4 LBT.

9. The method of claim 7, wherein a length of the CP extension is 0, C1 times a symbol length minus 25 μs, C2 times the symbol length minus 16 μs minus a timing advance (TA), or C3 multiplied by the symbol length minus 25 μs minus the TA.

10. A user equipment (UE), comprising:
- a memory;
- a transceiver; and
- a processor coupled to the memory and the transceiver;
- wherein the processor is configured to determine, based on a signaling from a base station, a combination of a listen before talk (LBT) type, a cyclic prefix (CP) extension, and a channel access priority class (CAPC) for an uplink transmission to the base station; wherein the signaling comprises a downlink control information (DCI) and a UE-specific radio resource control (RRC) signaling; wherein the DCI comprises an information field indicating the combination of the LBT type, the CP extension, and the CAPC; wherein the information field in the DCI comprises indexes indicating the combination of the LBT type, the CP extension, and the CAPC from a list of combinations of the LBT type, the CP extension, and the CAPC in the UE-specific RRC signaling; wherein the UE-specific RRC signaling indicates the list of combinations of the LBT type, the CP extension, and the CAPC from a first table; wherein the first table is predefined; wherein the list of combinations of the LBT type, the CP extension, and the CAPC is a partial of the first table; wherein a number of the indexes of the information field in the DCI is related to a number of combinations of the LBT type, the CP extension, and the CAPC in the list of combinations of the LBT type, the CP extension, and the CAPC.

11. The UE of claim 10, wherein a length of the CP extension is 0, C1 times a symbol length minus 25 μs, C2 times the symbol length minus 16 μs minus a timing advance (TA), or C3 multiplied by the symbol length minus 25 μs minus the TA.

12. A base station, comprising:
- a memory;
- a transceiver; and
- a processor coupled to the memory and the transceiver; wherein the processor is configured to perform the method of claim 7.

* * * * *